United States Patent
Tal et al.

(10) Patent No.: US 12,373,342 B2
(45) Date of Patent: Jul. 29, 2025

(54) ORCHESTRATION OF UNMAP REQUESTS RECEIVED FROM WRITE CACHE INSTANCES OF A DISTRIBUTED STORAGE SYSTEM

(71) Applicant: Dell Products L.P., Round Rock, TX (US)

(72) Inventors: Doron Tal, Geva Carmel (IL); Yosef Shatsky, Karnei Shomron (IL); Ali Aiouaz, Bee Cave, TX (US); Amitai Alkalay, Kadima (IL)

(73) Assignee: Dell Products L.P., Round Rock, TX (US)

( * ) Notice: Subject to any disclaimer, the term of this patent is extended or adjusted under 35 U.S.C. 154(b) by 222 days.

(21) Appl. No.: 18/471,680

(22) Filed: Sep. 21, 2023

(65) Prior Publication Data

US 2025/0103489 A1    Mar. 27, 2025

(51) Int. Cl.
*G06F 12/02* (2006.01)
(52) U.S. Cl.
CPC ............... *G06F 12/0253* (2013.01)
(58) Field of Classification Search
CPC ............ G06F 12/0253; G06F 12/0261; G06F 12/0269; G06F 12/0276; G06F 2212/702; G06F 2212/7205
USPC .................................................... 711/166
See application file for complete search history.

(56) References Cited

U.S. PATENT DOCUMENTS

| | | | |
|---|---|---|---|
| 12,099,443 B1* | 9/2024 | Tal | G06F 12/0868 |
| 2016/0092121 A1* | 3/2016 | Nazari | G06F 3/0665 |
| | | | 711/103 |
| 2016/0313943 A1* | 10/2016 | Hashimoto | G06F 16/1847 |
| 2017/0364456 A1* | 12/2017 | Dong | G06F 3/0604 |
| 2019/0042442 A1* | 2/2019 | Hutchison | G06F 3/0631 |
| 2019/0079692 A1* | 3/2019 | Venkatesan | G06F 3/067 |
| 2019/0258568 A1* | 8/2019 | Park | G06F 3/0659 |
| 2020/0285398 A1* | 9/2020 | Krishnamurthy | G06F 3/061 |

(Continued)

OTHER PUBLICATIONS

E. Burgener et al., "High Data Growth and Modern Applications Drive New Storage Requirements in Digitally Transformed Enterprises," IDC Doc. #US49359722, Jul. 2022, 17 pages.

(Continued)

*Primary Examiner* — Reginald G Bragdon
*Assistant Examiner* — Aaron D Ho
(74) *Attorney, Agent, or Firm* — Ryan, Mason & Lewis, LLP

(57) ABSTRACT

An apparatus comprises at least one processing device configured to receive unmap requests for freeing up data previously written to one or more storage regions of at least one storage device of a distributed storage system, the unmap requests being received from two or more write cache instances of two or more storage nodes of the distributed storage system. The processing device is also configured to identify at least a subset of the unmap requests which are directed to a given storage region of the at least one storage device. The processing device is further configured to provide the subset of the unmap requests to at least one storage controller associated with the at least one storage device of the distributed storage system responsive to determining that at least one designated unmap condition has been met.

20 Claims, 9 Drawing Sheets

(56) References Cited

U.S. PATENT DOCUMENTS

2023/0315296 A1* 10/2023 Utevsky .............. G06F 12/0875
2024/0134799 A1* 4/2024 Shatsky .............. G06F 12/0871

OTHER PUBLICATIONS

Y. Liu et al., "Smash: Flexible, Fast, and Resource-efficient Placement and Lookup of Distributed Storage," Proceedings of the ACM on Measurement and Analysis of Computing Systems, vol. 7, No. 2, May 22, 2023, 22 pages.

A. Huffman et al., "Overcoming the Write Amplification Problem with NVM Express® Flexible Data Placement," https://nvmexpress.org/nvmeflexible-data-placement-fdp-blog/#:~:text=The%20NVM%20Express%20(NVMe%C2%AE,when%20these%20write%20requests%20occur., Accessed Sep. 20, 2023, 4 pages.

* cited by examiner

ORCHESTRATION OF UNMAP REQUESTS RECEIVED FROM WRITE CACHE INSTANCES OF A DISTRIBUTED STORAGE SYSTEM

BACKGROUND

Information processing systems often include distributed arrangements of multiple nodes, also referred to herein as distributed processing systems. Such systems can include, for example, distributed storage systems comprising multiple storage nodes. These distributed storage systems are often dynamically reconfigurable under software control in order to adapt the number and type of storage nodes and the corresponding system storage capacity as needed, in an arrangement commonly referred to as a software-defined storage system. For example, in a typical software-defined storage system, storage capacities of multiple distributed storage nodes are pooled together into one or more storage pools. Data within the system is partitioned, striped, and replicated across the distributed storage nodes. For a storage administrator, the software-defined storage system provides a logical view of a given dynamic storage pool that can be expanded or contracted at ease, with simplicity, flexibility, and different performance characteristics. For applications running on a host device that utilizes the software-defined storage system, such a storage system provides a logical storage object view to allow a given application to store and access data, without the application being aware that the data is being dynamically distributed among different storage nodes potentially at different sites.

SUMMARY

Illustrative embodiments of the present disclosure provide techniques for orchestration of unmap requests received from write cache instances of a distributed storage system.

In one embodiment, an apparatus comprises at least one processing device comprising a processor coupled to a memory. The at least one processing device is configured to receive a plurality of unmap requests for freeing up data previously written to one or more storage regions of at least one storage device of a distributed storage system, the plurality of unmap requests being received from two or more write cache instances of two or more storage nodes of the distributed storage system. The at least one processing device is also configured to identify at least a subset of the plurality of unmap requests which are directed to a given one of the one or more storage regions of the at least one storage device, and to determine, for the given storage region, whether at least one designated unmap condition has been met. The at least one processing device is further configured to provide the subset of the plurality of unmap requests to at least one storage controller associated with the at least one storage device of the distributed storage system responsive to determining that the at least one designated unmap condition has been met.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
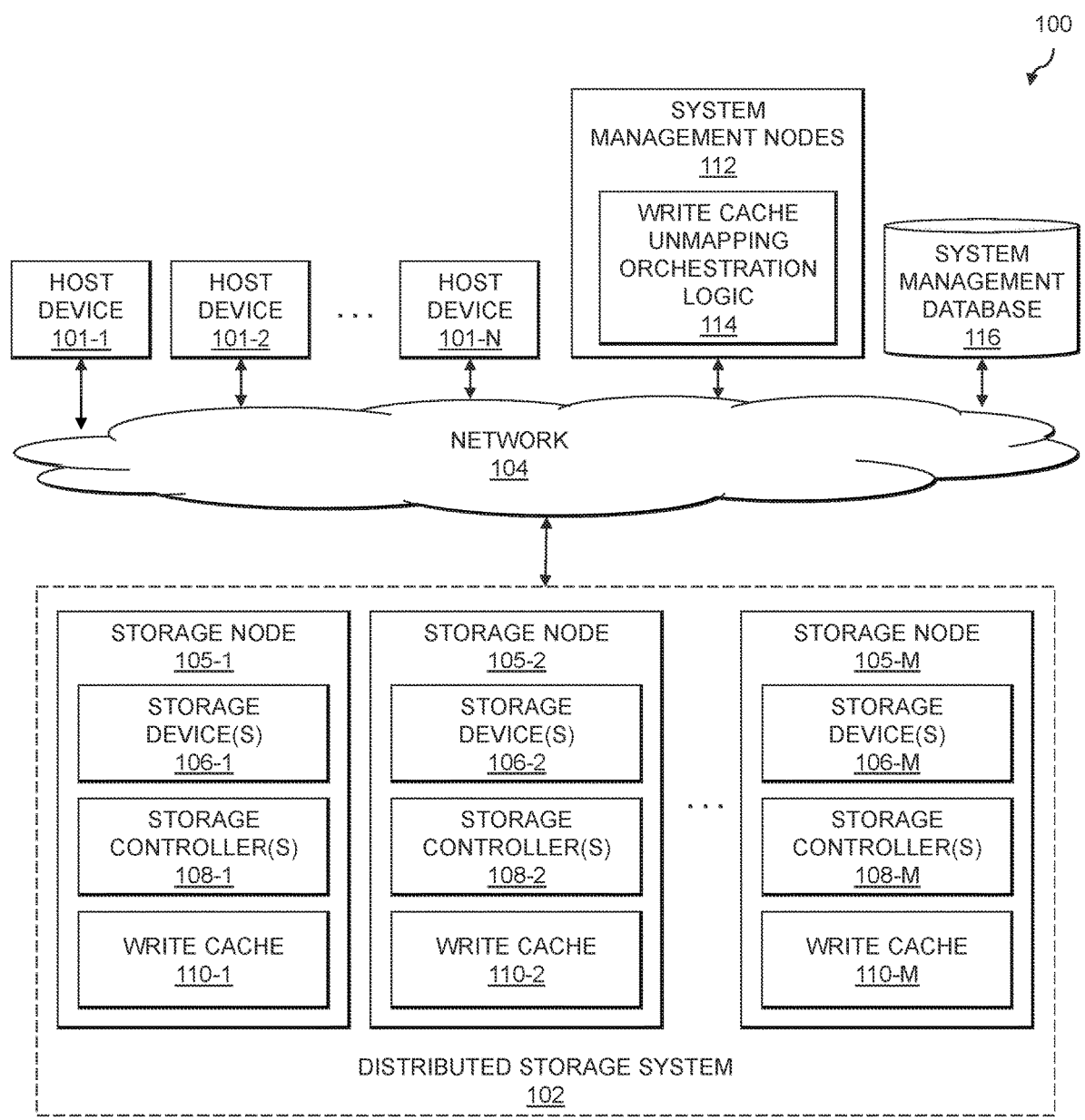
FIG. 1 is a block diagram of an information processing system configured for orchestration of unmap requests received from write cache instances of a distributed storage system in an illustrative embodiment.

FIG. 1 shows an information processing system 100 configured in accordance with an illustrative embodiment. The information processing system 100 comprises a plurality of host devices 101-1, 101-2, . . . 101-N, collectively referred to herein as host devices 101, and a distributed storage system 102 shared by the host devices 101. The distributed storage system 102 is an example of what is more generally referred to herein as a distributed processing system, which may include a combination of one or more compute and storage nodes. The host devices 101 and distributed storage system 102 in this embodiment are configured to communicate with one another via a network 104 that illustratively utilizes protocols such as Transmission Control Protocol (TCP) and/or Internet Protocol (IP), and may therefore be referred to herein as a TCP/IP network, although it is to be appreciated that the network 104 can operate using additional or alternative protocols. In some embodiments, the network 104 comprises a storage area network (SAN) that includes one or more Fibre Channel (FC) switches, Ethernet switches or other types of switch fabrics.

The distributed storage system 102 more particularly comprises a plurality of storage nodes 105-1, 105-2, . . . 105-M, collectively referred to herein as storage nodes 105. The values N and M in this embodiment denote arbitrary integer values that in the figure are illustrated as being greater than or equal to three, although other values such as N=1, N=2, M=1 or M=2 can be used in other embodiments.

The storage nodes 105 collectively form the distributed storage system 102, which is just one possible example of what is generally referred to herein as a "distributed storage system." Other distributed storage systems can include different numbers and arrangements of storage nodes, and possibly one or more additional components. For example, as indicated above, a distributed storage system in some embodiments may include only first and second storage nodes, corresponding to an M=2 embodiment. Some embodiments can configure a distributed storage system to include additional components in the form of a system manager implemented using one or more additional nodes.

In some embodiments, the distributed storage system 102 provides a logical address space that is divided among the storage nodes 105, such that different ones of the storage nodes 105 store the data for respective different portions of the logical address space. Accordingly, in these and other similar distributed storage system arrangements, different ones of the storage nodes 105 have responsibility for different portions of the logical address space. For a given logical storage volume, logical blocks of that logical storage volume are illustratively distributed across the storage nodes 105.

Other types of distributed storage systems can be used in other embodiments. For example, distributed storage system 102 can comprise multiple distinct storage arrays, such as a production storage array and a backup storage array, possibly deployed at different locations. Accordingly, in some embodiments, one or more of the storage nodes 105 may each be viewed as comprising at least a portion of a separate storage array with its own logical address space. Alternatively, the storage nodes 105 can be viewed as collectively comprising one or more storage arrays. The term "storage node" as used herein is therefore intended to be broadly construed.

In some embodiments, the distributed storage system 102 comprises a software-defined storage system and the storage nodes 105 comprise respective software-defined storage server nodes of the software-defined storage system, such nodes also being referred to herein as SDS server nodes, where SDS denotes software-defined storage. Accordingly, the number and types of storage nodes 105 can be dynamically expanded or contracted under software control in some embodiments.

Each of the storage nodes 105 is illustratively configured to interact with one or more of the host devices 101. The host devices 101 illustratively comprise servers or other types of computers of an enterprise computer system, cloud-based computer system or other arrangement of multiple compute nodes associated with respective users.

The host devices 101 in some embodiments illustratively provide compute services such as execution of one or more applications on behalf of each of one or more users associated with respective ones of the host devices 101. Such applications illustratively generate input-output (IO) operations that are processed by a corresponding one of the storage nodes 105. The term "input-output" as used herein refers to at least one of input and output. For example, IO operations may comprise write requests and/or read requests directed to logical addresses of a particular logical storage volume of one or more of the storage nodes 105. These and other types of IO operations are also generally referred to herein as IO requests.

The IO operations that are currently being processed in the distributed storage system 102 in some embodiments are referred to herein as "in-flight" IOs that have been admitted by the storage nodes 105 for further processing within the system 100. The storage nodes 105 are illustratively configured to queue IO operations arriving from one or more of the host devices 101 in one or more sets of IO queues, possibly using the write caches 110-1, 110-2, . . . 110-M (collectively, write caches 110) implemented by the storage nodes 105.

The storage nodes 105 illustratively comprise respective processing devices of one or more processing platforms. For example, the storage nodes 105 can each comprise one or more processing devices each having a processor and a memory, possibly implementing virtual machines and/or containers, although numerous other configurations are possible.

The storage nodes 105 can additionally or alternatively be part of cloud infrastructure, such as a cloud-based system implementing Storage-as-a-Service (STaaS) functionality.

The storage nodes 105 may be implemented on a common processing platform, or on separate processing platforms.

The host devices 101 are illustratively configured to write data to and read data from the distributed storage system 102 comprising storage nodes 105 in accordance with applications executing on those host devices 101 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise. Combinations of cloud and edge infrastructure can also be used in implementing a given information processing system to provide services to users.

Communications between the components of system 100 can take place over additional or alternative networks, including a global computer network such as the Internet, a wide area network (WAN), a local area network (LAN), a satellite network, a telephone or cable network, a cellular network such as 4G or 5G cellular network, a wireless network such as a WiFi or WiMAX network, or various portions or combinations of these and other types of networks. The system 100 in some embodiments therefore comprises one or more additional networks other than network 104 each comprising processing devices configured to communicate using TCP, IP and/or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand or Gigabit Ethernet, in addition to or in place of FC. Numerous alternative networking arrangements are possible in a given embodiment, as will be appreciated by those skilled in the art. Other examples include remote direct memory access (RDMA) over Converged Ethernet (ROCE) or InfiniBand over Ethernet (IBOE).

The first storage node 105-1 comprises a plurality of storage devices 106-1, one or more associated storage controllers 108-1, and one or more write caches 110-1. The storage devices 106-1 illustratively store metadata pages and user data pages associated with one or more storage volumes of the distributed storage system 102. The storage volumes illustratively comprise respective logical units (LUNs) or other types of logical storage volumes. The storage devices 106-1 more particularly comprise local persistent storage devices of the first storage node 105-1. Such persistent storage devices are local to the first storage node 105-1, but remote from the second storage node 105-2, the storage node 105-M and any other ones of other storage nodes 105.

Each of the other storage nodes 105-2 through 105-M is assumed to be configured in a manner similar to that described above for the first storage node 105-1. Accordingly, by way of example, storage node 105-2 comprises a plurality of storage devices 106-2, one or more associated storage controllers 108-2 and one or more write caches 110-2, and storage node 105-M comprises a plurality of storage devices 106-M, one or more associated storage controllers 108-M and one or more write caches 110-M.

As indicated previously, the storage devices 106-2 through 106-M illustratively store metadata pages and user data pages associated with one or more storage volumes of the distributed storage system 102, such as the above-noted LUNs or other types of logical storage volumes. The storage devices 106-2 more particularly comprise local persistent storage devices of the storage node 105-2. Such persistent storage devices are local to the storage node 105-2, but remote from the first storage node 105-1, the storage node 105-M, and any other ones of the storage nodes 105. Similarly, the storage devices 106-M more particularly comprise local persistent storage devices of the storage node 105-M. Such persistent storage devices are local to the storage node 105-M, but remote from the first storage node 105-1, the second storage node 105-2, and any other ones of the storage nodes 105.

The local persistent storage of a given one of the storage nodes 105 illustratively comprises the particular local persistent storage devices that are implemented in or otherwise associated with that storage node. It is assumed that such local persistent storage devices of the given storage node are accessible to the storage controllers of that storage node via a local interface, and are accessible to storage controllers 108 of respective other ones of the storage nodes 105 via remote interfaces. For example, it is assumed in some embodiments disclosed herein that each of the storage devices 106 on a given one of the storage nodes 105 can be accessed by the given storage node via its local interface, or by any of the other storage nodes 105 via an RDMA interface. A given storage application executing on the storage nodes 105 illustratively requires that all of the storage nodes 105 be able to access all of the storage devices 106. Such access to local persistent storage of each node from the other storage nodes can be performed, for example, using the RDMA interfaces with the other storage nodes, although numerous other arrangements are possible.

The storage controllers 108 of the storage nodes 105 may include additional modules and other components typically found in conventional implementations of storage controllers and storage systems, although such additional modules and other components are omitted from the figure for clarity and simplicity of illustration.

The storage controllers 108 may be associated with the write caches 110 and one or more write cache journals, both illustratively distributed across the storage nodes 105 of the distributed storage system. It is further assumed in illustrative embodiments that one or more additional journals are provided in the distributed storage system, such as, for example, a metadata update journal and possibly other journals providing other types of journaling functionality for IO operations. Illustrative embodiments disclosed herein are assumed to be configured to perform various destaging processes for write caches and associated journals, and to perform additional or alternative functions in conjunction with processing of IO operations.

The storage devices 106 of the storage nodes 105 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices. Such storage devices are examples of storage devices 106 of the storage nodes 105 of the distributed storage system 102 of FIG. 1.

In some embodiments, the storage nodes 105 of the distributed storage system 102 collectively provide a scale-out storage system, although the storage nodes 105 can be used to implement other types of storage systems in other embodiments. One or more such storage nodes can be associated with at least one storage array. Additional or alternative types of storage products that can be used in implementing a given storage system in illustrative embodiments include software-defined storage, cloud storage and object-based storage. Combinations of multiple ones of these and other storage types can also be used.

As indicated above, the storage nodes 105 in some embodiments comprise respective software-defined storage server nodes of a software-defined storage system, in which the number and types of storage nodes 105 can be dynamically expanded or contracted under software control using software-defined storage techniques.

The term "storage system" as used herein is therefore intended to be broadly construed, and should not be viewed as being limited to certain types of storage systems, such as content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the host devices 101 and the storage nodes 105 comprise NVMe commands of an NVMe storage access protocol, for example, as described in the NVMe Specification, Revision 2.0a, July 2021, which is incorporated by reference herein. Other examples of NVMe storage access protocols that may be utilized in illustrative embodiments disclosed herein include NVMe over Fabrics, also referred to herein as NVMeF, and NVMe over TCP, also referred to herein as NVMe/TCP. Other embodiments can utilize other types of storage access protocols. As another example, communications between the host devices 101 and the storage nodes 105 in some embodiments can comprise Small Computer System Interface (SCSI) or Internet SCSI (iSCSI) commands.

Other types of commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other types, formats and configurations of IO operations can be used in other embodiments, as that term is broadly used herein.

Some embodiments disclosed herein are configured to utilize one or more RAID arrangements to store data across the storage devices 106 in each of one or more of the storage nodes 105 of the distributed storage system 102.

The RAID arrangement can comprise, for example, a RAID 5 arrangement supporting recovery from a failure of a single one of the plurality of storage devices, a RAID 6 arrangement supporting recovery from simultaneous failure of up to two of the storage devices, or another type of RAID arrangement. For example, some embodiments can utilize RAID arrangements with redundancy higher than two.

The term "RAID arrangement" as used herein is intended to be broadly construed, and should not be viewed as limited to RAID 5, RAID 6 or other parity RAID arrangements. For example, a RAID arrangement in some embodiments can comprise combinations of multiple instances of distinct RAID approaches, such as a mixture of multiple distinct RAID types (e.g., RAID 1 and RAID 6) over the same set of storage devices, or a mixture of multiple stripe sets of different instances of one RAID type (e.g., two separate instances of RAID 5) over the same set of storage devices. Other types of parity RAID techniques and/or non-parity RAID techniques can be used in other embodiments.

Such a RAID arrangement is illustratively established by the storage controllers 108 of the respective storage nodes 105. The storage devices 106 in the context of RAID arrangements herein are also referred to as "disks" or "drives." A given such RAID arrangement may also be referred to in some embodiments herein as a "RAID array."

The RAID arrangement used in an illustrative embodiment includes an array of n different "disks" denoted 1 through n, each a different physical storage device of the storage devices 106. Multiple such physical storage devices are typically utilized to store data of a given LUN or other logical storage volume in the distributed storage system. For example, data pages or other data blocks of a given LUN or other logical storage volume can be "striped" along with its corresponding parity information across multiple ones of the disks in the RAID arrangement in accordance with RAID 5 or RAID 6 techniques.

A given RAID 5 arrangement defines block-level striping with single distributed parity and provides fault tolerance of a single drive failure, so that the array continues to operate with a single failed drive, irrespective of which drive fails. For example, in a conventional RAID 5 arrangement, each stripe includes multiple data blocks as well as a corresponding p parity block. The p parity blocks are associated with respective row parity information computed using well-known RAID 5 techniques. The data and parity blocks are distributed over the disks to support the above-noted single distributed parity and its associated fault tolerance.

A given RAID 6 arrangement defines block-level striping with double distributed parity and provides fault tolerance of up to two drive failures, so that the array continues to operate with up to two failed drives, irrespective of which two drives fail. For example, in a conventional RAID 6 arrangement, each stripe includes multiple data blocks as well as corresponding p and q parity blocks. The p and q parity blocks are associated with respective row parity information and diagonal parity information computed using well-known RAID 6 techniques. The data and parity blocks are distributed over the disks to collectively provide a diagonal-based configuration for the p and q parity information, so as to support the above-noted double distributed parity and its associated fault tolerance.

In such RAID arrangements, the parity blocks are typically not read unless needed for a rebuild process triggered by one or more storage device failures.

These and other references herein to RAID 5, RAID 6 and other particular RAID arrangements are only examples, and numerous other RAID arrangements can be used in other embodiments. Also, other embodiments can store data across the storage devices 106 of the storage nodes 105 without using RAID arrangements.

In some embodiments, the storage nodes 105 of the distributed storage system 102 of FIG. 1 are connected to each other in a full mesh network, and are collectively managed by a system manager. A given set of storage devices 106 on a given one of the storage nodes 105 is illustratively implemented in a disk array enclosure (DAE) or other type of storage array enclosure of that storage node. Each of the storage nodes 105 illustratively comprises a CPU or other type of processor, a memory, a network interface card (NIC) or other type of network interface, and its corresponding storage devices 106, possibly arranged as part of a DAE of the storage node.

In some embodiments, different ones of the storage nodes 105 are associated with the same DAE or other type of storage array enclosure. The system manager is illustratively implemented as a management module or other similar management logic instance, possibly running on one or more of the storage nodes 105, on another storage node and/or on a separate non-storage node of the distributed storage system.

As a more particular non-limiting illustration, the storage nodes 105 in some embodiments are paired together in an arrangement referred to as a "brick," with each such brick being coupled to a different DAE comprising multiple drives, and each node in a brick being connected to the DAE and to each drive through a separate connection. The system manager may be running on one of the two nodes of a first one of the bricks of the distributed storage system. Again, numerous other arrangements of the storage nodes are possible in a given distributed storage system as disclosed herein.

The system 100 as shown further comprises a plurality of system management nodes 112 that are illustratively configured to provide system management functionality of the type noted above. Such functionality in the present embodiment illustratively further involves the orchestration of unmap operations on the write caches 110 utilizing write cache unmapping orchestration logic 114. An unmap operation comprises an instruction to a storage device (e.g., one of the storage devices 106) that some portion of the storage space of the storage device is no longer in use. For example, an unmap request or command may be issued to instruct a storage device that particular disk blocks contain data which has been deleted, such that those disk block can be deallocated. The write cache unmapping orchestration logic 114 is configured to receive unmap commands or requests from the write caches 110, and coordinates the timing of delivery of such unmap commands or requests to the storage controllers 108 such that designated amounts of storage space (e.g., corresponding to block sizes at which data of the write caches 110 are stored on the storage devices 106) are freed at once, which can reduce write amplification for the storage devices 106. In some embodiments, at least portions of the system management nodes 112 are distributed over the storage nodes 105. For example, a designated subset of the storage nodes 105 can each be configured to include one or more instances of the write cache unmapping orchestration logic 114 (e.g., for different ones of or groups of the storage devices 106). Other system management functionality provided by system management nodes 112 can be similarly distributed over a subset of the storage nodes 105.

The system management database 116 stores configuration and operation information of the system 100 and portions thereof are illustratively accessible to various system administrators such as host administrators and storage administrators. In some embodiments, the system management database 116 stores information related to timestamps of write requests for data written to the write caches 110, where such timestamp information may be used to group unmap commands or requests which are stored in the same physical region of the storage devices 106. In some embodiments, IO operations are processed in the host devices 101 utilizing respective instances of path selection logic in the following manner. A given one of the host devices 101 establishes a plurality of paths between at least one initiator of the given host device and a plurality of targets of respective storage nodes 105 of the distributed storage system 102. Accordingly, the given host device illustratively comprises a plurality of initiators and supports one or more paths between each of the initiators and one or more targets on respective ones of the storage nodes 105.

For each of a plurality of IO operations generated in the given host device for delivery to the distributed storage system 102, the host device determines a particular portion of the logical storage volume to which the IO operation is directed, and identifies, based at least in part on stored locality information, which of the storage nodes 105 of the distributed storage system 102 stores the particular portion of the logical storage volume. The given host device then selects a path to the identified storage node, and sends the IO operation to the identified storage node over the selected path.

It is to be appreciated that host-based locality determination and associated path selection as disclosed herein can be performed independently by each of the host devices 101, illustratively utilizing their respective instances of path selection logic, as indicated above, with possible involvement of additional or alternative system components, such as locality processing logic. Such logic instances can be implemented within or otherwise in association with one or more multi-path drivers of the host devices 101.

In some embodiments, the initiator of the given host device and the targets of the respective storage nodes 105 are configured to support a designated standard storage access protocol, such as an NVMe storage access protocol or a SCSI storage access protocol. As more particularly examples in the NVMe context, the designated storage access protocol may comprise an NVMeF or NVMe/TCP storage access protocol, although a wide variety of additional or alternative storage access protocols can be used in other embodiments.

As mentioned above, the distributed storage system 102 in some embodiments comprises a software-defined storage system and the storage nodes 105 comprise respective software-defined storage server nodes of the software-defined storage system.

In some embodiments, the given host device is configured to select paths for delivery of IO operations to the storage nodes 105 based at least in part on stored locality information, in a manner that ensures that the IO operations are directly delivered to the particular storage nodes 105 that locally store the corresponding targeted portions of the logical storage volume. Different mappings or other types and arrangements of locality information are illustratively stored by the given host device for different LUNs or other logical storage volumes that are accessed by the given host device.

The host devices 101 can comprise additional or alternative components. For example, in some embodiments, the host devices 101 further comprise respective sets of IO queues and respective multi-path input-output (MPIO) drivers. The MPIO drivers collectively comprise a multi-path layer of the host devices 101. Path selection functionality for delivery of IO operations from the host devices 101 to the distributed storage system 102 is provided in the multi-path layer by respective instances of path selection logic associated with the MPIO drivers. In some embodiments, the instances of path selection logic are implemented at least in part within the MPIO drivers of the host devices 101.

The MPIO drivers may comprise, for example, otherwise conventional MPIO drivers, such as PowerPath® drivers from Dell Technologies, suitably modified in the manner disclosed herein to provide functionality for host-based locality determination and associated path selection based at least in part on stored locality information. Other types of MPIO drivers from other driver vendors may be suitably modified to incorporate functionality for host-based locality determination and associated path selection as disclosed herein.

In some embodiments, the instances of path selection logic include or are otherwise associated with locality processing logic that is configured to obtain the locality information from the storage nodes 105. These and other aspects of locality determination functionality may illustratively be implemented within the MPIO drivers of respective host devices 101.

In some embodiments, the host devices 101 comprise respective local caches, implemented using respective memories of those host devices. A given such local cache can be implemented using one or more cache cards. A wide variety of different caching techniques can be used in other embodiments, as will be appreciated by those skilled in the art. Other examples of memories of the respective host devices 101 that may be utilized to provide local caches include one or more memory cards or other memory devices, such as, for example, an NVMe over PCIe cache card, a local flash drive or other type of NVM storage drive, or combinations of these and other host memory devices.

The MPIO drivers are illustratively configured to deliver IO operations selected from their respective sets of IO queues to the distributed storage system 102 via selected ones of multiple paths over the network 104. The sources of the IO operations stored in the sets of IO queues illustratively include respective processes of one or more applications executing on the host devices 101. For example, IO operations can be generated by each of multiple processes of a database application running on one or more of the host devices 101. Such processes issue IO operations for delivery to the distributed storage system 102 over the network 104. Other types of sources of IO operations may be present in a given implementation of system 100.

A given IO operation is therefore illustratively generated by a process of an application running on a given one of the host devices 101, and is queued in one of the IO queues of the given host device with other operations generated by other processes of that application, and possibly other processes of other applications.

The paths from the given host device to the distributed storage system 102 illustratively comprise paths associated with respective initiator-target pairs, with each initiator comprising a host bus adaptor (HBA) or other initiating entity of the given host device and each target comprising a port or other targeted entity corresponding to one or more of the storage devices 106 of the distributed storage system 102. As noted above, the storage devices 106 illustratively comprise LUNs or other types of logical storage devices, including logical storage devices also referred to herein as logical storage volumes.

In some embodiments, the paths are associated with respective communication links between the given host device and the distributed storage system 102 with each such communication link having a negotiated link speed. For example, in conjunction with registration of a given HBA to a switch of the network 104, the HBA and the switch may negotiate a link speed. The actual link speed that can be achieved in practice in some cases is less than the negotiated link speed, which is a theoretical maximum value.

Negotiated rates of the respective particular initiator and the corresponding target illustratively comprise respective negotiated data rates determined by execution of at least one link negotiation protocol for an associated one of the paths.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC) addresses on a single network interface of an Ethernet network interface card (NIC). Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used. In some embodiments, the NPIV feature of FC allows a single host HBA port to expose multiple World Wide Numbers (WWNs) or other types of identifiers to the network 104 and the distributed storage system 102.

Accordingly, in some embodiments, multiple virtual initiators are associated with a single HBA of a given one of the host devices 101 but have respective unique identifiers associated therewith.

Additionally or alternatively, different ones of the multiple virtual initiators are illustratively associated with respective different ones of a plurality of virtual machines of the given host device that share a single HBA of the given host device, or a plurality of logical partitions of the given host device that share a single HBA of the given host device.

Again, numerous alternative virtual initiator arrangements are possible, as will be apparent to those skilled in the art. The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

Various scheduling algorithms, load balancing algorithms and/or other types of algorithms can be utilized by the MPIO driver of the given host device in delivering IO operations from the IO queues of that host device to the distributed storage system 102 over particular paths via the network 104. Each such IO operation is assumed to comprise one or more commands for instructing the distributed storage system 102 to perform particular types of storage-related functions such as reading data from or writing data to particular logical volumes of the distributed storage system 102. Such commands are assumed to have various payload sizes associated therewith, and the payload associated with a given command is referred to herein as its "command payload."

A command directed by the given host device to the distributed storage system 102 is considered an "outstanding" command until such time as its execution is completed in the viewpoint of the given host device, at which time it is considered a "completed" command. The commands illustratively comprise respective NVMe commands, although other command formats, such as SCSI command formats, can be used in other embodiments. In the SCSI context, a given such command is illustratively defined by a corresponding command descriptor block (CDB) or similar format construct. The given command can have multiple blocks of payload associated therewith, such as a particular number of 512-byte SCSI blocks or other types of blocks. Other command formats are utilized in the NVMe context.

In illustrative embodiments to be described below, it is assumed without limitation that the initiators of a plurality of initiator-target pairs comprise respective HBAs of the given host device and that the targets of the plurality of initiator-target pairs comprise respective ports of the distributed storage system 102. A wide variety of other types and arrangements of initiators and targets can be used in other embodiments.

Selecting a particular one of multiple available paths for delivery of a selected one of the IO operations from the given host device is more generally referred to herein as "path selection." Path selection as that term is broadly used herein can in some cases involve both selection of a particular IO operation and selection of one of multiple possible paths for accessing a corresponding logical device of the distributed storage system 102. The corresponding logical device illustratively comprises a LUN or other logical storage volume to which the particular IO operation is directed.

It should be noted that paths may be added or deleted between the host devices 101 and the distributed storage system 102 in the system 100. For example, the addition of one or more new paths from the given host device to the distributed storage system 102 or the deletion of one or more existing paths from the given host device to the distributed storage system 102 may result from respective addition or deletion of at least a portion of the storage devices 106 of the distributed storage system 102.

Addition or deletion of paths can also occur as a result of zoning and masking changes or other types of storage system reconfigurations performed by a storage administrator or other user. Some embodiments are configured to send a predetermined command from the given host device to the distributed storage system 102, illustratively utilizing the MPIO driver, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the distributed storage system 102 as well to discover the disappearance of any existing LUNs that have been deleted from the distributed storage system 102.

The MPIO driver of the given host device in some embodiments comprises a user-space portion and a kernel-space portion. The kernel-space portion of the MPIO driver may be configured to detect one or more path changes of the type mentioned above, and to instruct the user-space portion of the MPIO driver to run a path discovery scan responsive to the detected path changes. Other divisions of functionality between the user-space portion and the kernel-space portion of the MPIO driver are possible. The user-space portion of the MPIO driver is illustratively associated with an Operating System (OS) kernel of the given host device.

For each of one or more new paths identified in the path discovery scan, the given host device may be configured to execute a host registration operation for that path. The host registration operation for a given new path illustratively provides notification to the distributed storage system 102 that the given host device has discovered the new path.

As indicated previously, the storage nodes 105 of the distributed storage system 102 process IO operations from one or more host devices 101 and in processing those IO operations run various storage application processes that generally involve interaction of that storage node with one or more other ones of the storage nodes.

In the FIG. 1 embodiment, the distributed storage system 102 comprises storage controllers 108 and corresponding sets of storage devices 106 along with write caches 110, and may include additional or alternative components.

The storage controllers 108 illustratively control the processing of IO operations received in the distributed storage system 102 from the host devices 101. For example, the storage controllers 108 illustratively manage the processing of read and write commands directed by the MPIO drivers of the host devices 101 to particular ones of the storage devices 106. The storage controllers 108 can be implemented as respective storage processors, directors or other storage system components configured to control storage system operations relating to processing of IO operations. In some embodiments, each of the storage controllers 108 has a different one of the above-noted local caches associated therewith, although numerous alternative arrangements are possible.

As indicated previously, the storage nodes 105 collectively comprise an example of a distributed storage system. The term "distributed storage system" as used herein is intended to be broadly construed, so as to encompass, for example, scale-out storage systems, clustered storage systems or other types of storage systems distributed over multiple storage nodes.

As another example, the storage nodes 105 in some embodiments are part of a distributed content addressable storage system in which logical addresses of data pages are mapped to physical addresses of the data pages in the storage devices 106 using respective hash digests, hash handles or other content-based signatures that are generated from those data pages using a secure hashing algorithm. A wide variety of other types of distributed storage systems can be used in other embodiments.

Also, the term "storage volume" as used herein is intended to be broadly construed, and should not be viewed as being limited to any particular format or configuration.

In some embodiments, the storage nodes 105 are implemented using processing modules that are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of the storage nodes 105 illustratively comprise control modules, data modules, routing modules and at least one management module. Again, these and possibly other processing modules of the storage nodes 105 are illustratively interconnected with one another in the full mesh network, such that each of the modules can communicate with each of the other modules, although other types of networks and different module interconnection arrangements can be used in other embodiments.

The management module in such an embodiment may more particularly comprise a system-wide management module, also referred to herein as a system manager. Other embodiments can include multiple instances of the management module implemented on different ones of the storage nodes 105.

A wide variety of alternative configurations of nodes and processing modules are possible in other embodiments. Also, the term "storage node" as used herein is intended to be broadly construed, and may comprise a node that implements storage control functionality but does not necessarily incorporate storage devices. As mentioned previously, a given storage node can in some embodiments comprise a separate storage array, or a portion of a storage array that includes multiple such storage nodes.

Communication links may be established between the various processing modules of the storage nodes using well-known communication protocols such as TCP/IP and RDMA. For example, respective sets of IP links used in data transfer and corresponding messaging could be associated with respective different ones of the routing modules.

The storage nodes 105 of the distributed storage system 102 implement respective write cache 110 instances. The write caches 110 are configured to issue map and unmap requests for data written to the storage devices 106. These map and unmap requests may come from many different write streams (e.g., from different sources, such as different ones of the instances of the write caches 110, host devices 101, etc.) in the distributed storage system 102. The write caches 110 may utilize an approach where, as part of write commands, applications provide a write stream identifier of a particular type of write stream, where the write stream identifier points to a particular region handle which points to a unit of storage space where data from the particular type of write stream will be stored. Once the storage space unit is filled, the region handle is updated to point to another storage space unit. The write caches 110 may be implemented as a cyclic buffer, where the write cache unmapping orchestration logic 114 coordinates unmap operations for each write stream identifier, such that entire storage space units (or at least a designated threshold percentage of the capacity of entire storage space units) are freed or unmapped at once, reducing write amplification. Such coordination or orchestration may be based on analysis of timestamps associated with write operations where the data was written from the write caches 110 to the storage space units of the storage device 106. Unmap requests for a given write stream identifier associated with write timestamps which are close in time to one another are likely to be stored in the same storage space unit or units. Thus, grouping the unmap requests based on the write timestamps is likely to ensure that entire storage space units (or close to entire storage space units) are unmapped at once.

The particular features described above in conjunction with FIG. 1 should not be construed as limiting in any way, and a wide variety of other system arrangements providing functionality for security management for endpoint nodes of distributed processing systems are possible.

The storage nodes 105 of the example distributed storage system 102 illustrated in FIG. 1 are assumed to be implemented using at least one processing platform, with each such processing platform comprising one or more processing devices, and each such processing device comprising a processor coupled to a memory. Such processing devices can illustratively include particular arrangements of compute, storage and network resources.

The storage nodes 105 may be implemented on respective distinct processing platforms, although numerous other arrangements are possible. At least portions of their associated host devices 101 may be implemented on the same processing platforms as the storage nodes 105 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different subsets of the host devices 101 and the storage nodes 105 to reside in different data centers. Numerous other distributed implementations of the storage nodes 105 and their respective associated sets of host devices 101 are possible.

Additional examples of processing platforms utilized to implement storage systems and possibly their associated host devices in illustrative embodiments will be described in more detail below in conjunction with FIGS. 7 and 8.

It is to be appreciated that these and other features of illustrative embodiments are presented by way of example only, and should not be construed as limiting in any way.

Accordingly, different numbers, types and arrangements of system components such as host devices 101, distributed storage system 102, storage nodes 105, storage devices 106, storage controllers 108, write caches 110, system management nodes 112, instances of write cache unmapping orchestration logic 114 and system management database 116 can be used in other embodiments. For example, as mentioned previously, system management functionality of the system management nodes 112 can be distributed across a subset of the storage nodes 105, instead of being implemented on separate nodes.

It should be understood that the particular sets of modules and other components implemented in a distributed storage system as illustrated in FIG. 1 are presented by way of example only. In other embodiments, only subsets of these components, or additional or alternative sets of components, may be used, and such components may exhibit alternative functionality and configurations.

For example, in some embodiments, certain portions of the functionality for write cache unmapping orchestration as disclosed herein may be implemented through cooperative interaction of one or more host devices, one or more storage nodes of a distributed storage system, and/or one or more system management nodes. Accordingly, such functionality can be distributed over multiple distinct processing devices. The term "at least one processing device" as used herein is therefore intended to be broadly construed.

The operation of the information processing system 100 will now be described in further detail with reference to the flow diagram of the illustrative embodiment of FIG. 2, which illustrates a process for orchestration of unmap requests received from write cache instances of a distributed storage system utilizing the write cache unmapping orchestration logic 114. This process may be viewed as an illustrative example of an algorithm implemented at least in part by one or more of the storage nodes 105 and/or one or more of the system management nodes 112 utilizing corresponding instances of the write cache unmapping orchestration logic 114. These and other algorithms for orchestration of unmap requests received from write cache instances of a distributed storage system as disclosed herein can be implemented using other types and arrangements of system components in other embodiments.

Figure 2:
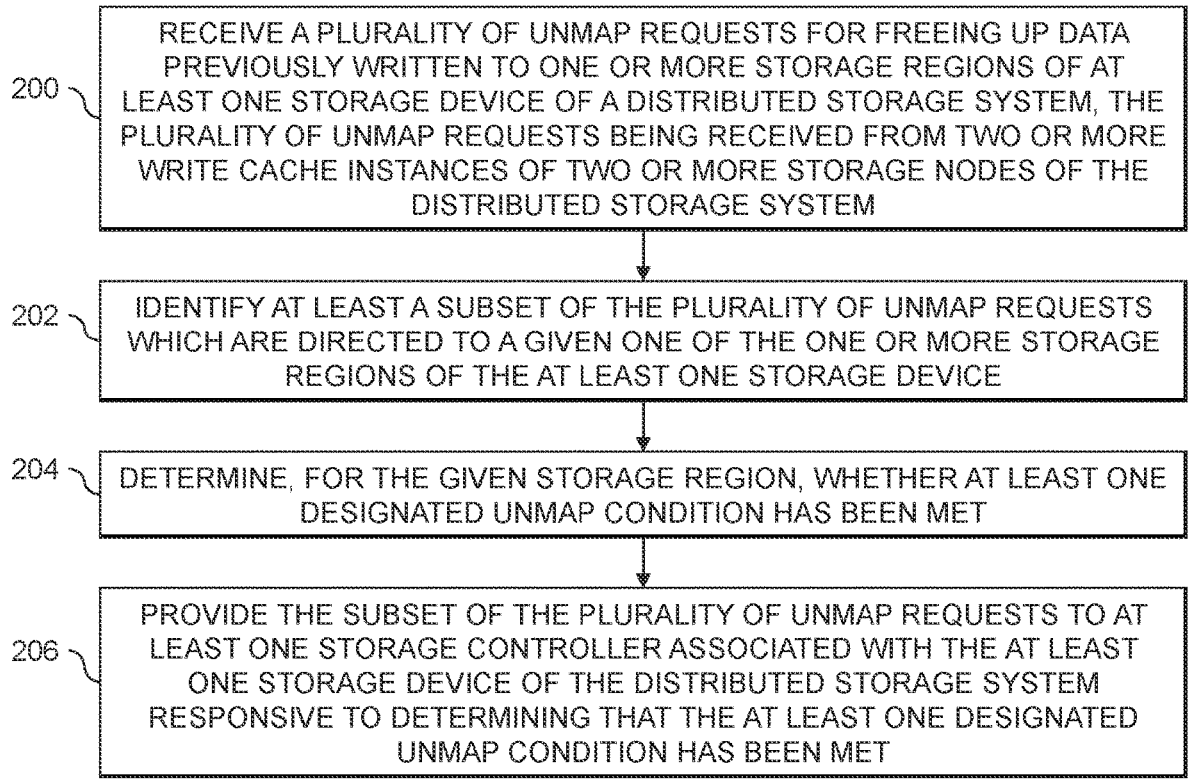
FIG. 2 is a flow diagram of an exemplary process for orchestration of unmap requests received from write cache instances of a distributed storage system in an illustrative embodiment.

The process illustrated in FIG. 2 includes steps 200 through 206. In step 200, a plurality of unmap requests for freeing up data previously written to one or more storage regions of at least one storage device of a distributed storage system is received. The plurality of unmap requests is received from two or more write cache instances of two or more storage nodes of the distributed storage system. The distributed storage system may comprise a scale-out storage system. The at least one storage device may comprise one of a plurality of storage devices of the two or more storage nodes of the distributed storage system providing backend storage capacity for the two or more write cache instances. The at least one storage device may comprise an SSD of one of the two or more storage nodes of the distributed storage system. The plurality of unmap requests may be part of two or more un-synchronized write-cache write streams received from the two or more write cache instances of the two or more storage nodes of the distributed storage system.

In step 202, at least a subset of the plurality of unmap requests which are directed to a given one of the one or more storage regions of the at least one storage device is identified. The given storage region may comprise a reclaim unit, and the subset of the plurality of unmap requests which are directed to the given storage region may be identified in step 202 based at least in part on reclaim unit handle identifiers associated with the subset of the plurality of unmap requests. Data may be written to the given storage region sequentially, and each of the plurality of unmap requests may comprise metadata specifying a timestamp at which a portion of data was previously written to a corresponding one of the one or more storage regions of the at least one storage device. Identifying the subset of the plurality of unmap requests which are directed to the given storage region in step 202 may be based at least in part on the timestamps of the plurality of unmap requests.

In step 204, a determination is made as to whether at least one designated unmap condition has been met for the given storage region. Step 204 may be performed responsive to identifying that an amount of unused capacity of the given storage region is less than a designated capacity threshold. The subset of the plurality of unmap requests are provided to at least one storage controller associated with the at least one storage device of the distributed storage system in step 206 responsive to determining that the at least one designated unmap condition has been met. The at least one designated unmap condition may comprise at least one of: determining that the subset of the plurality of unmap requests frees up at least a designated threshold amount of a total capacity of the given storage region; and detecting that at least a designated threshold amount of time has passed since a most recent one of the plurality of unmap requests directed to the given storage region. The given storage region may be associated with a given reclaim unit handle identifier. The at least one designated unmap condition may comprise determining that at least a threshold number of unmap requests have been received which are directed to another one of the one or more storage regions also associated with the given reclaim unit handle identifier, wherein data is written to the given storage region and the other one of the one or more storage regions sequentially. The at least one designated unmap condition may also or alternatively comprise determining that at least another subset of the plurality of unmap requests frees up at least a designated threshold amount of a total capacity of the other storage region.

In some embodiments, the FIG. 2 process is performed by a processing device which comprises at least a portion of a control plane of the distributed processing system configured for communication with the plurality of endpoint nodes of the distributed processing system over one or more networks. At least a portion of the control plane may be implemented in a distributed manner across two or more of the plurality of endpoint nodes of the distributed processing system.

The distributed processing system may comprise a software-defined storage system, and the plurality of endpoint nodes may comprise respective software-defined storage server nodes of the software-defined storage system.

The distributed processing system may comprise a cloud-based processing system, and the plurality of endpoint nodes may comprise respective cloud endpoint nodes operating on one or more clouds of one or more cloud service providers.

The steps of the FIG. 2 process are shown in sequential order for clarity and simplicity of illustration only, and certain steps can at least partially overlap with other steps. Additional or alternative steps can be used in other embodiments.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for orchestration of unmap requests received from write cache instances of a distributed storage system. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different unmap request orchestration processes for respective different distributed processing systems, or for a different set of endpoints nodes of a same distributed processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Host devices, storage nodes and system management nodes can be implemented as part of what is more generally referred to herein as a processing platform comprising one or more processing devices each comprising a processor coupled to a memory.

A given such processing device in some embodiments may correspond to one or more virtual machines or other types of virtualization infrastructure such as Docker containers or Linux containers (LXCs). Host devices, storage nodes, system management nodes and other system components may be implemented at least in part using processing devices of such processing platforms. For example, respective path selection logic instances and other related logic instances of the host devices can be implemented in respective containers running on respective ones of the processing devices of a processing platform.

Advanced storage systems implement functionality for various data services, for data reduction (e.g., compression, deduplication, etc.), etc. To implement at least some of this functionality, a storage system may first store new incoming data in a write cache. This allows the storage system to acknowledge writes quickly, then process the written data and write the processed data to its resting place in backend storage. In some cases, a write cache uses persistent memory storage media. In other cases, the write cache may use standard storage media, such as one or more SSDs. Storing a write cache on SSDs is highly appealing for software-defined storage (SDS) solutions, since such an approach relies on standard commodity hardware (e.g., SSDs). SSDs, however, have limited endurance, so placing the write cache on an SSD will reduce the lifespan of the SSD considerably (e.g., due to write amplification).

An approach referred to as flexible data placement or flash direct placement (FDP) may be used to reduce write amplification for SSDs. To minimize write amplification, SSDs implementing FDP require applications to perform writes and unmaps in a certain way. Illustrative embodiments provide technical solutions for leveraging FDP to reduce write amplification and wearing associated with write cache writes of highly distributed storage solutions. It should be noted that, in the description below, the terms "storage system" and "application" may be used interchangeably as, from the perspective of an SSD used to implement the backend storage for a write cache, a "storage system" is an application (e.g., the storage system may write data to and/or read data from the SSD).

With FDP, as part of a write command, an application provides a Reclaim Unit Handle Identifier (RUHI). The RUHI points to a Reclaim Unit Handle (RUH), which points to a Reclaim Unit (RU). An SSD implementing FDP will not mix, in the same RU, writes with different RUHIs. Writes for a given RUHI will be written to the same RU until the space in that RU is exhausted, at which point the SSD will point the RUH to a new empty RU. Subsequent writes with the given RUHI will be written to the new empty RU until that RU is filled, at which point the RUH will be updated to point to another new empty RU, and so on. The SSD will also perform garbage collection (GC) internally just like a "standard" SSD (e.g., an SSD which does not utilize FDP), in order to condense two or more partially empty RUs into fewer valid RUs, freeing the rest for new writes. As a result of the GC processing, the SSD re-writes old data, generating or resulting in write amplification.

Conventional approaches for FDP are typically applied for just a single SSD. For large distributed storage systems (e.g., scale-out storage clusters), a key challenge for leveraging FDP is to invalidate the data on a given RU quickly enough (e.g., before the SSD's internal GC functionality processes the given RU and copies the residual data stored in the given RU resulting in write amplification). For example, an application may write sequentially. The application, before running out of space, will issue an unmap command or request that invalidates large, old sequential regions of the SSD, thus turning entire RUs into fully empty space and avoiding GC write amplification. A distributed scale-out storage system, however, may employ a multitude of un-synchronized write cache write streams (e.g., from different host devices, from different applications, etc.). Such un-synchronized write cache write streams may span all SSDs to ensure that the distributed scale-out storage system is well-balanced (e.g., such that a given SSD will experience writes coming from many sources). Moreover, to leverage modern multi-core central processing units (CPUs), a storage system may be parallelized even within the premises of a single server, increasing the magnitude of the synchronization challenge. However, many scale-out solutions are well balanced, so on a large enough scale (e.g., 10 seconds), the different components experience similar read and write load. This balance characteristic is leveraged by the technical solutions described herein. It should be noted, however, that there is no need for "perfect" balance, as FDP copes well with non-perfect conditions in meeting an objective of reducing write amplification.

Figure 3:
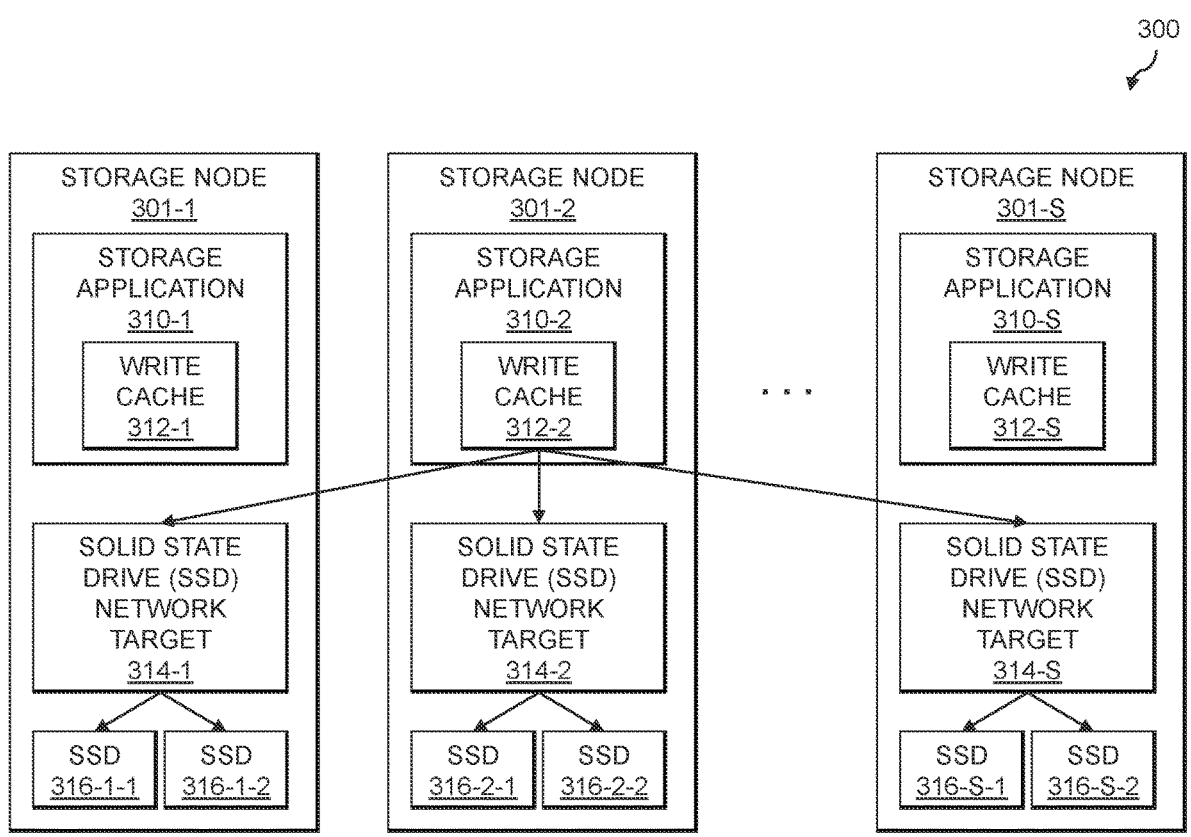
FIG. 3 shows a scale-out storage system with multiple write caches in an illustrative embodiment.

FIG. 3 shows a scale-out storage system 300 comprising a plurality of storage nodes 301-1, 301-2, . . . 301-S (collectively, storage nodes 301). Each of the storage nodes 301-1, 301-2, . . . 301-S implements a storage application 310-1, 310-2, . . . 310-S (collectively, storage applications 310) comprising a write cache 312-1, 312-2, . . . 312-S (collectively, write caches 312). Each of the storage nodes 301-1, 301-2, . . . 301-S also implements an SSD network target 314-1, 314-2, . . . 314-S (collectively, SSD network targets 314) and a set of SSDs. The storage node 301-1 comprises SSDs 316-1-1 and 316-1-2 (collectively, SSDs 316-1), the storage node 301-2 comprises SSDs 316-2-1 and 316-2-2 (collectively, SSDs 316-2), . . . the storage node 301-S comprises SSDs 316-S-1 and 316-S-2 (collectively, SSDs 316-S). The SSDs 316-1, 316-2, 316-S are collectively referred to as SSDs 316. Although FIG. 3 shows an arrangement where each of the storage nodes 301 comprises two SSDs, it should be appreciated that a storage node may comprise any desired number of SSDs, and each storage node of a scale-out storage system need not comprise the same number of SSDs (e.g., a first storage node of a scale-out storage system may have a first number of SSDs and a second storage node of the scale-out storage system may have a second number of SSDs different than the first number of SSDs). As shown in FIG. 3, the write cache 312-2 is able to write to any of the SSDs 316 across any of the storage nodes 301 via the SSD network targets 314. Although not explicitly shown, each of the other write caches 312 is assumed to be able to write to any of the SSDs 316 across any of the storage nodes 301 via the SSD network targets 314. It should also be noted that data may be written with redundancy (e.g., the same data may be written by one of the write caches 312 to multiple ones of the SSDs 316 on the same or different storage nodes 301).

The technical solutions described herein, in some embodiments, leverage FDP and orchestrate or synchronize bulk unmap operations. Advantageously, the technical solutions described herein have no performance penalty for writes to write caches, and there is only minor extra overhead for synchronizing the unmap operations. The technical solutions in some embodiments rely on a distributed write cache and one or more unmap orchestrator components.

As noted above, each write cache of a scale-out storage system may write to any SSD in a scale-out storage system. The exact scheme used for mapping write cache writes to SSDs is not important. Whenever one of the write caches sends a write to one of the SSDs, it should use the same system-wide write cache RUHI and record a timestamp. The clock used for sampling the time should be synchronized across the entire scale-out storage system—the storage system should have synchronized clocks with good enough accuracy. A "good enough" accuracy, in some embodiments, is such that the number of bytes that can be written within an error range is no more than a designated fraction of the RU size. For example, with an RU of 8 gigabytes (GB), an error of 80 megabytes (MB) may be acceptable (e.g., an error range of 1%). Assuming the system's aggregated write cache write rate per SSD is 1 GB per second (GB/s), an upper limit for the clock error level is 80 milliseconds (ms). Various approaches may achieve orders of magnitude better precision very easily.

Figure 4:
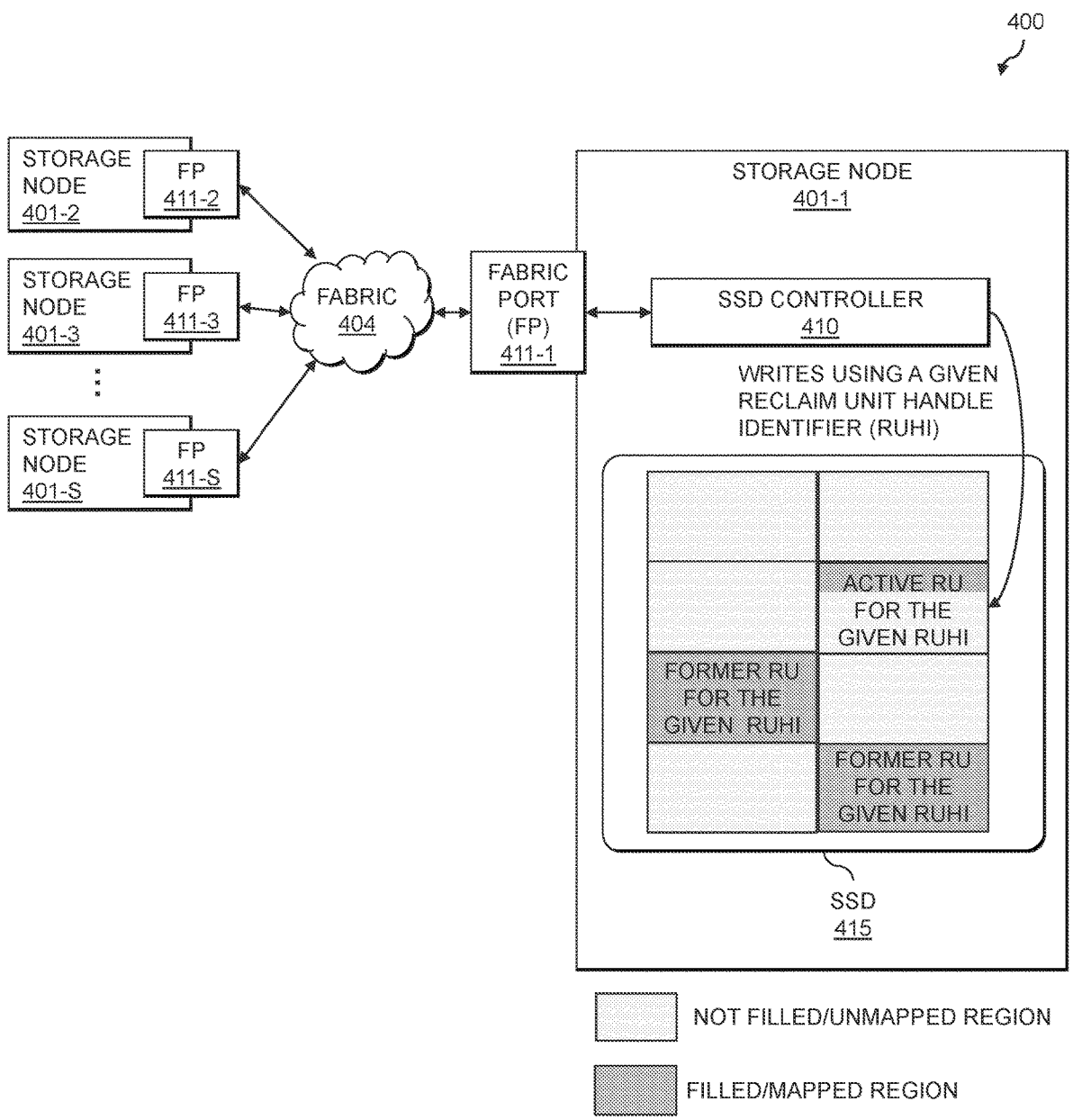
FIG. 4 shows a system in which multiple servers perform non-coordinated writes to a write cache in an illustrative embodiment.

FIG. 4 shows a storage system 400 including a set of storage nodes 401-1, 401-2, 401-3, . . . 401-S (collectively, storage nodes 401). Each of the storage nodes 401-1, 401-2, 401-3, . . . 401-S is assumed to have at least one fabric port (FP) 411-1, 411-2, 411-3, . . . 411-S (collectively, FPs 411) enabling interconnection of the storage nodes 401 via fabric 404. As shown in FIG. 4, the storage node 401-1 comprises an SSD controller 410 and at least one SSD 415. The storage node 401-1 may receive write requests from write caches (not shown) on any of the storage nodes 401. It is assumed that the write requests use write cache RUHIs, such that data is written to particular RUs of the SSD 415 in accordance with the write cache RUHIs. FIG. 4 shows eight RUs, including one active (e.g., partially filled) RU for a given RUHI and two former (e.g., filled) RUs for the given RUHI. In FIG. 4, space which is filled (e.g., mapped) is shaded dark gray while space which is not filled (e.g., unmapped) is shaded light gray. FIG. 4 shows an example of multiple non-coordinated write cache writes. The SSD controller 410 sends all the writes with the given RUHI to the same RU until that RU is full, at which point the SSD controller 410 allocates a new RU for the given RUHI.

To allow freeing up whole RUs to avoid write amplification, the write cache should unmap old areas before reusing such areas for new data. The size of the unmapped write cache portion should be large enough to release full or entire RUs. The exact size depends on the RU size and the ratio of the number of write caches to the number of SSDs in the storage system. For example, assuming an RU size of 8 GB, a ratio of the number of write caches to the number of SSDs of 2:1, and a write cache size of 32 GB, unmapping 12-16 GB at once is reasonable. The write cache illustratively operates as a cyclic buffer, so writes and unmaps are sequential. It should be noted, however, that minor deviations from sequentiality will not severely impact the overall result. Due to the scale-out nature of the storage system, each SSD will receive many write cache streams. However, since all the write cache streams behave similarly, the aggregated behavior of a collection of segments of write caches will behave similarly to a single write cache. The size of the virtual aggregated write cache is proportional to the number of write caches in the storage system divided by the number of SSDs in the storage system. So, as long as the virtual aggregated write cache has a large enough unmapped region, the system can unmap full RUs (e.g., in an ideal case). It should be noted that if an entire RU is unmapped at the same time, this represents an ideal or perfect case. The technical solutions described herein, however, will still work in non-perfect or non-ideal scenarios where only part of an RU is unmapped at the same time. This may not be perfect, but still provides significant value. For instance, there could be different triggers to un-map an RU or other region (e.g., whether there are enough unmap request, timeout conditions, whether a write cache requires movement of its tail pointer, etc.). If an RU is not fully un-mapped, then the remaining data will be subject to the SSD's GC processing. However, as long as a large portion of the RU (e.g., 80% or some other designated threshold) then there is not a lot of data for the SSD's GC processing to handle and therefore there will still be write amplification improvements. It is also possible to read the data that does not need to be unmapped, and perform GC processing in the storage stack to avoid the SSD's GC processing and mixing of data.

In illustrative embodiments, upon unmapping a write cache region, the write cache will send an unmap command (also referred to as an unmap request) to an unmap orchestrator component instead of sending the unmap command or request directly to the SSD (e.g., through an SSD network target). In addition, the write cache will add the timestamp of the unmapped write to the unmap orchestrator component. The unmap orchestrator component will lump or group together unmap commands or requests of several writes, assuming that one or more constraints are met. Such constraints may relate to the timestamps of the writes. For example, the unmap orchestrator component may lump together unmap commands or requests of two or more writes as long as the time delta between the first and last timestamps of the two or more writes is small enough (e.g., less than some designated threshold).

Figure 5A:
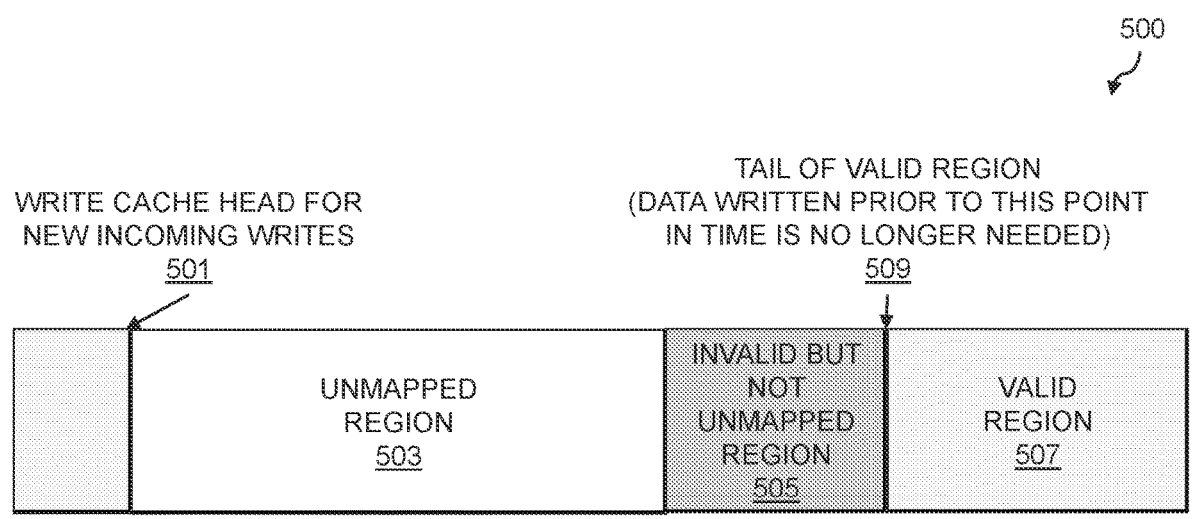
FIGS. 5A and 5B show a write cache logical view and a write cache logical to physical mapping in an illustrative embodiment.
Figure 5B:
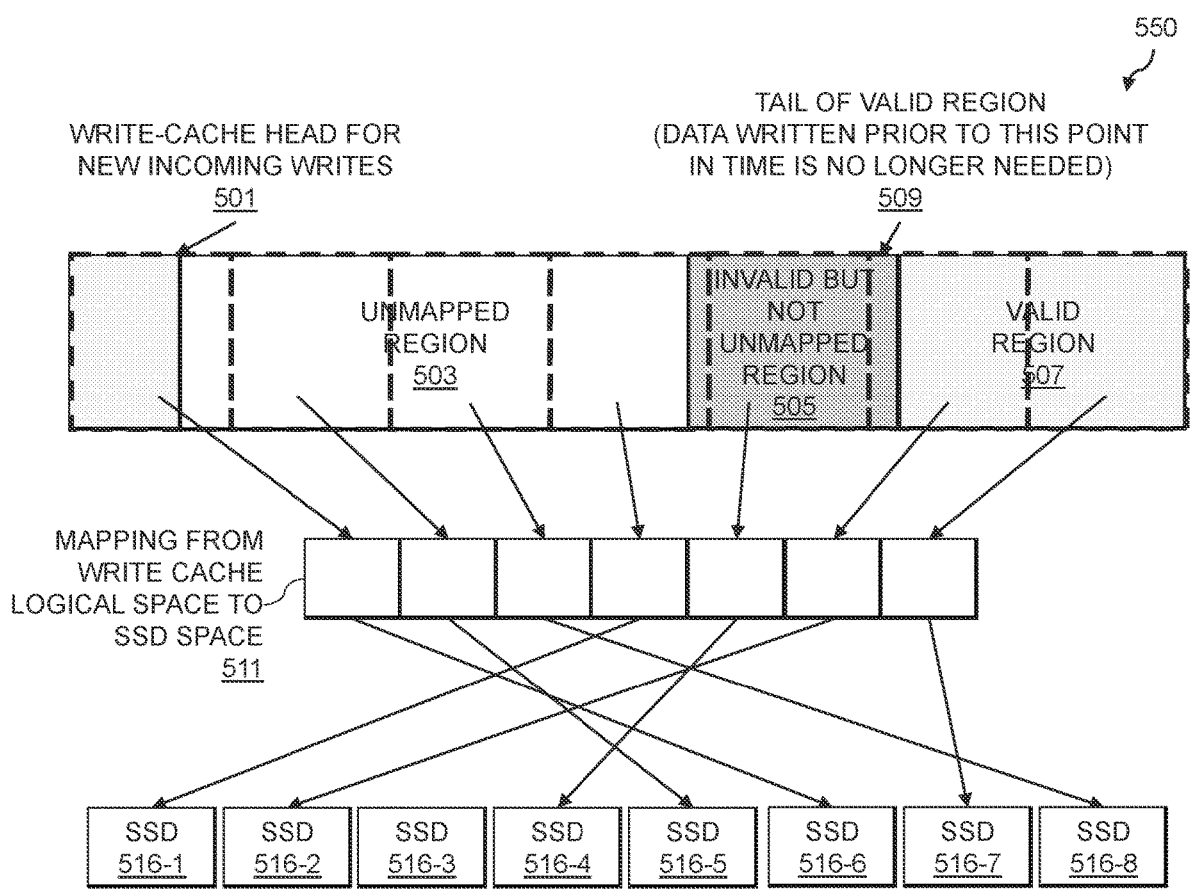

FIG. 5A shows a logical view 500 of a write cache, including a write cache head for new incoming writes 501, an unmapped region 503, an invalid but not unmapped region 505 and a valid region 507. The border between the invalid but not unmapped region 505 and the valid region 507 represents the tail 509 of the valid region 507. The tail 509 represents a given point in time where data written prior to the given point in time is no longer needed. FIG. 5B shows a logical to physical mapping 550 for the write cache. The unmapped region 503, the invalid but not unmapped region 505 and the valid region 507 of the write cache are divided into seven logical segments (e.g., shown in FIG. 5B in bold dashed outline). These logical segments of the logical space of the write cache are mapped 511 to physical storage space in a set of SSDs 516-1, 516-2, 516-3, 516-4, 516-5, 516-6, 516-7, and 516-8 (collectively, SSDs 516). Although not shown in FIG. 5B for clarity, in some embodiments each logical segment of the logical space of the write cache may be mapped to multiple different ones of the SSDs 516 for redundancy. Further, the particular number of logical segments of the write cache and the number of SSDs 516 shown in FIG. 5B are presented by way of example only. In some embodiments, a write cache may be split into more or fewer logical segments, and a scale-out storage system may include more or fewer SSDs.

Figure 6:
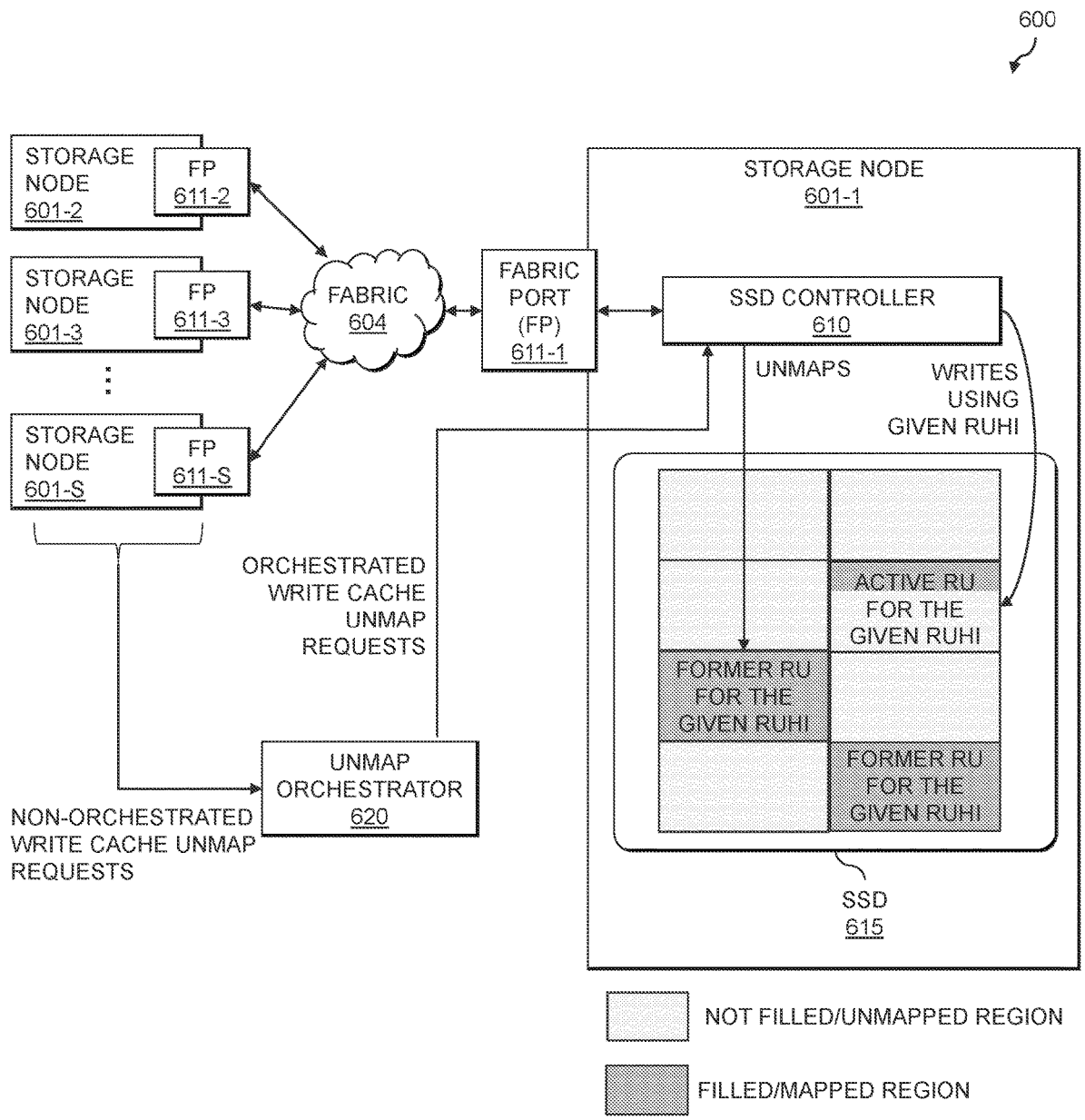
FIG. 6 shows an unmap orchestrator configured to process non-orchestrated write cache unmap requests from multiple servers into one or more orchestrated write cache unmap requests provided to a write cache in an illustrative embodiment.

FIG. 6 shows a storage system 600 including a set of storage nodes 601-1, 601-2, 601-3, . . . 601-S (collectively, storage nodes 601). Each of the storage nodes 601-1, 601-2, 601-3, . . . 601-S is assumed to have at least one FP 611-1, 611-2, 611-3, . . . 611-S (collectively, FPs 611) enabling interconnection of the storage nodes 601 via fabric 604. As shown in FIG. 6, the storage node 601 comprises an SSD controller 610 and at least one SSD 615. The storage node 601-1 may receive write requests from write caches (not shown) on any of the storage nodes 601. It is assumed that the write requests use write cache RUHIs, such that data is written to particular RUs of the SSD 615 in accordance with the write cache RUHIs. FIG. 6 shows eight RUs, including one active (e.g., partially filled) RU for a given RUHI and two former (e.g., filled) RUs for the given RUHI. In FIG. 6, space which is filled (e.g., mapped) is shaded dark gray while space which is not filled (e.g., unmapped) is shaded light gray. FIG. 6 shows an example of multiple non-coordinated write cache writes. The SSD controller 610 sends all the writes with the given RUHI to the same RU until that RU is full, at which point the SSD controller 610 allocates a new RU for the given RUHI.

The storage system 600 further includes an unmap orchestrator 620. Although shown as external to the storage nodes 601, in some embodiments the unmap orchestrator 620 may be implemented on one or more of the storage nodes 601. Further, there may be multiple instances of the unmap orchestrator 620 (e.g., for different SSDs storing data of the write cache). The unmap orchestrator 620 operates at the SSD level, and hence it can be easily distributed by assigning different SSD ownerships to different instances of the unmap orchestrator 620.

Each RU in the SSD 615 will hold writes of one or more write caches written in a specific time span using different write cache RUHIs. Therefore, the key to avoiding write amplification is to unmap the writes mapped to a given RU before the SSD 615's GC processing kicks in. To achieve this, the write cache will regularly query the SSD 615 for the number of bytes (or other measure of storage space) remaining for writing in the current RU pointed to by a given RUHI. The unmap orchestrator 620 will log the timestamp whenever the number runs to zero. The unmap orchestrator 620 will identify RUs based on the timestamp range they were active. As unmap requests arrive from the different write caches across the storage nodes 601 of the storage system 600, the unmap orchestrator 620 will identify to which RU each unmap request belongs. The unmap orchestrator 620 will also count the accumulated amount of unmap bytes, or other measure of storage space, for each RU. Once the amount of unmap bytes, or other measure of storage space, crosses a designated threshold (e.g., 95%), the unmap orchestrator 620 will send all the unmap requests to the SSD 615 via the SSD controller 610. This should be quick enough so the GC processing of the SSD 615 will not start condensing RUs while there are still many unmap requests in flight. Other options include issuing all the unmap requests in bulk, or sending a GC pause hint before starting to send the unmap requests. The unmap orchestrator 620 is thus able to collect non-orchestrated write cache unmap requests from write caches of the storage nodes 601, and then issue orchestrated write cache unmap requests to the SSD controller 610. The orchestrated write cache unmap requests include unmaps of temporally local writes (e.g., determined based on write timestamps, which may be communicated to the unmap orchestrator 620, written as metadata in writes to the SSD 615 where such metadata may be read by the unmap orchestrator 620, etc.) which will free space in physically local regions (e.g., the same RU) on the SSD 615.

RU unmap accounting is not guaranteed to be error free since it is time based. Thus, the unmap orchestrator 620 may be configured to allow some room for error and issue the unmap requests toward the SSD 615 if certain designated conditions have been met. An example set of conditions include: (1) determining that a designated threshold (e.g., 95%) of the capacity of a given RU has been unmapped, (2) determining that a designated threshold period of time (e.g., 5 seconds) has passed since an unmap counter update for the given RU, and (3) determining that the following RU (e.g., the next allocated RU following the given RU) unmap counter is larger than a designated threshold (e.g., 10%). When these or other designated conditions (also referred to as unmap and wait conditions) have been met, the unmap requests for the given RU may be sent to the SSD controller 610. It should be noted that the technical solutions described herein can work with SSDs with different RU sizes by adapting the unmap and wait conditions implemented in instances of the unmap orchestrator 620 for each SSD in the storage system 600. Advantageously, the technical solutions described herein are able to leverage FDP in scale-out storage systems to significantly reduce the write amplification of a distributed write cache with little or no performance impact.

In some cases, there may be a race condition as unmap requests are being issued to an SSD. Unmap request specify a continuous range, but the logical block addresses (LBAs) written in an RU are not guaranteed to be continuous, and rarely will be in practice. Thus, a series of unmap requests or comments may be required. While unmap requests or commands are sent and being processed, an SSD might orthogonally be selecting areas on which to perform GC processing (e.g., due to other writes happening and forcing the need for space). An RU with some unmap requests processed (while other unmap requests are not yet processed) would be a good candidate for GC processing. Various approaches may be used to avoid the SSD's GC processing working on an RU that is in the process of being unmapped. One approach is freeze/unfreeze an RU (e.g., remove a given RU from the pool of GC candidates, then place the given RU back in the pool of GC candidates once all its unmap requests have been processed). Another approach, in a perfect case, would be to create a new unmap request or command (e.g., an unmap (RU) command or request) which unmaps an entire RU at once rather then performing a sequence of unmap operations. As only LBAs can be targeted as RU numbers may not be known, the command would be to "unmap all LBAs that belong to the same RU as [input LBA]." Yet another approach would be to read all data that will not be unmapped so it can be written somewhere else, such that the unmap becomes the perfect or ideal case.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for orchestration of unmap requests received from write cache instances of a distributed storage system will now be described in greater detail with reference to FIGS. 7 and 8. Although described in the context of system 100, these platforms may also be used to implement at least portions of other information processing systems in other embodiments.

Figure 7:
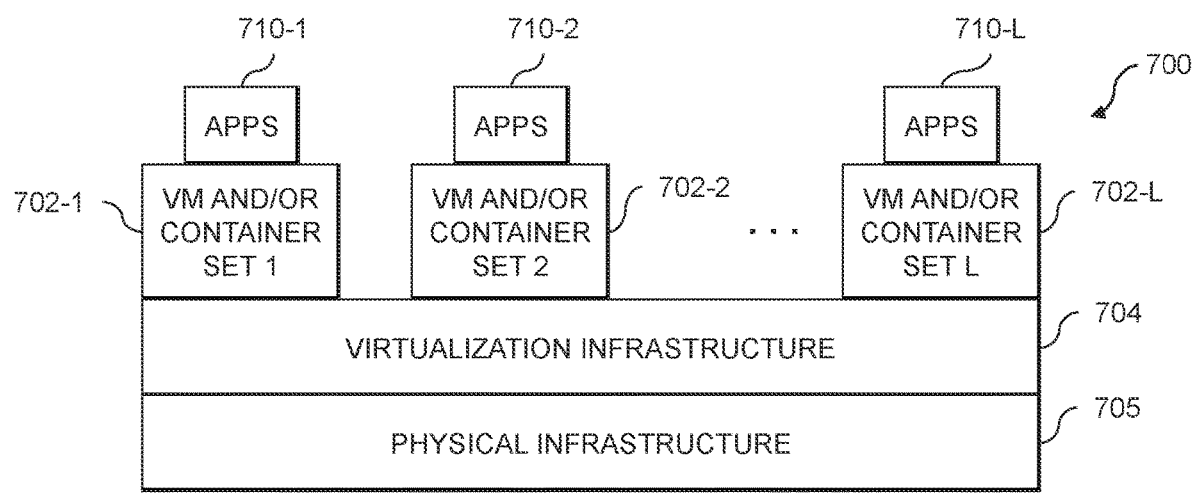
FIGS. 7 and 8 show examples of processing platforms that may be utilized to implement at least a portion of an information processing system in illustrative embodiments.
Figure 8:
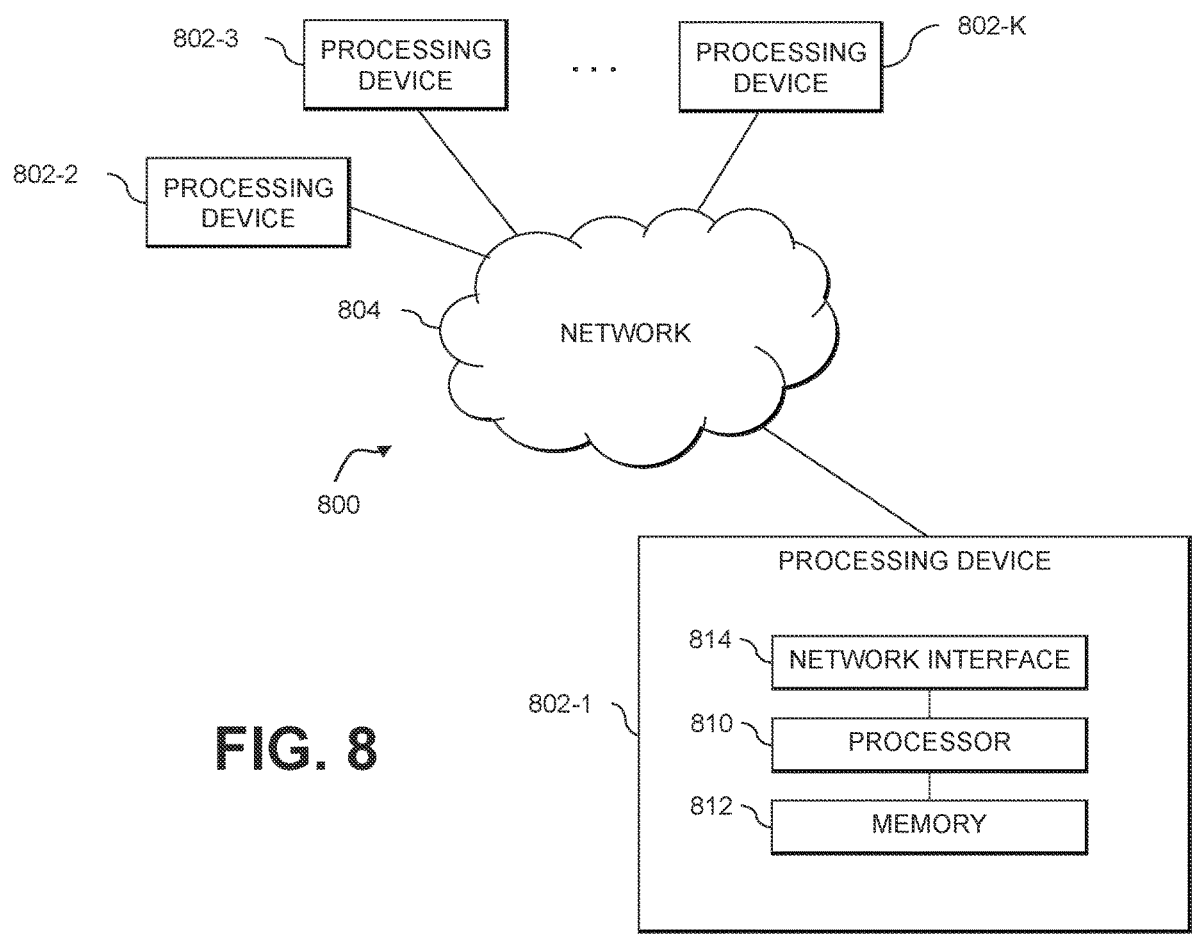

FIG. 7 shows an example processing platform comprising cloud infrastructure 700. The cloud infrastructure 700 comprises a combination of physical and virtual processing resources that may be utilized to implement at least a portion of the information processing system 100 in FIG. 1. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 1304 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for orchestration of unmap requests received from write cache instances of a distributed storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
 at least one processing device comprising a processor coupled to a memory;
 the at least one processing device being configured:
  to receive a plurality of unmap requests for freeing up data previously written to one or more storage regions of at least one storage device of a distributed storage system, the plurality of unmap requests being received from two or more write cache instances of two or more storage nodes of the distributed storage system;
  to identify at least a subset of the plurality of unmap requests which are directed to a given one of the one or more storage regions of the at least one storage device;
  to determine, for the given storage region, whether at least one designated unmap condition has been met; and
  to provide the subset of the plurality of unmap requests to at least one storage controller associated with the at least one storage device of the distributed storage system responsive to determining that the at least one designated unmap condition has been met.

2. The apparatus of claim 1 wherein the distributed storage system comprises a scale-out storage system.

3. The apparatus of claim 1 wherein the at least one storage device comprises one of a plurality of storage devices of the two or more storage nodes of the distributed storage system providing backend storage capacity for the two or more write cache instances.

4. The apparatus of claim 1 wherein the at least one storage device comprises a solid state drive of one of the two or more storage nodes of the distributed storage system.

5. The apparatus of claim 1 wherein the plurality of unmap requests is part of two or more un-synchronized write-cache write streams received from the two or more write cache instances of the two or more storage nodes of the distributed storage system.

6. The apparatus of claim 1 wherein the given storage region comprises a reclaim unit, and wherein the subset of the plurality of unmap requests which are directed to the given storage region are identified based at least in part on reclaim unit handle identifiers associated with the subset of the plurality of unmap requests.

7. The apparatus of claim 1 wherein data is written to the given storage region sequentially.

8. The apparatus of claim 7 wherein each of the plurality of unmap requests comprises metadata specifying a timestamp at which a portion of data was previously written to a corresponding one of the one or more storage regions of the at least one storage device.

9. The apparatus of claim 8 wherein identifying the subset of the plurality of unmap requests which are directed to the given storage region is based at least in part on the timestamps of the plurality of unmap requests.

10. The apparatus of claim 1 wherein the at least one designated unmap condition comprises determining that the subset of the plurality of unmap requests frees up at least a designated threshold amount of a total capacity of the given storage region.

11. The apparatus of claim 1 wherein the at least one designated unmap condition comprises detecting that at least a designated threshold amount of time has passed since a most recent one of the plurality of unmap requests directed to the given storage region.

12. The apparatus of claim 1 wherein the given storage region is associated with a given reclaim unit handle identifier, wherein the at least one designated unmap condition comprises determining that at least a threshold number of unmap requests have been received which are directed to another one of the one or more storage regions also associated with the given reclaim unit handle identifier, and wherein data is written to the given storage region and the other one of the one or more storage regions sequentially.

13. The apparatus of claim 1 wherein the given storage region is associated with a given reclaim unit handle identifier, wherein the at least one designated unmap condition comprises determining that at least another subset of the plurality of unmap requests frees up at least a designated threshold amount of a total capacity of another one of the one or more storage regions, and wherein data is written to the given storage region and the other one of the one or more storage regions sequentially.

14. The apparatus of claim 1 wherein determining whether the at least one designated unmap condition has been met is performed responsive to identifying that an amount of unused capacity of the given storage region is less than a designated capacity threshold.

15. A computer program product comprising a non-transitory processor-readable storage medium having stored therein program code of one or more software programs, wherein the program code when executed by at least one processing device causes the at least one processing device:
to receive a plurality of unmap requests for freeing up data previously written to one or more storage regions of at least one storage device of a distributed storage system, the plurality of unmap requests being received from two or more write cache instances of two or more storage nodes of the distributed storage system;
to identify at least a subset of the plurality of unmap requests which are directed to a given one of the one or more storage regions of the at least one storage device;
to determine, for the given storage region, whether at least one designated unmap condition has been met; and
to provide the subset of the plurality of unmap requests to at least one storage controller associated with the at least one storage device of the distributed storage system responsive to determining that the at least one designated unmap condition has been met.

16. The computer program product of claim 15 wherein data is written to the given storage region sequentially, wherein each of the plurality of unmap requests comprises metadata specifying a timestamp at which a portion of data was previously written to a corresponding one of the one or more storage regions of the at least one storage device, and wherein identifying the subset of the plurality of unmap requests which are directed to the given storage region is based at least in part on the timestamps of the plurality of unmap requests.

17. The computer program product of claim 15 wherein the at least one designated unmap condition comprises determining that the subset of the plurality of unmap requests frees up at least a designated threshold amount of a total capacity of the given storage region.

18. A method comprising:
receiving a plurality of unmap requests for freeing up data previously written to one or more storage regions of at least one storage device of a distributed storage system, the plurality of unmap requests being received from two or more write cache instances of two or more storage nodes of the distributed storage system;
identifying at least a subset of the plurality of unmap requests which are directed to a given one of the one or more storage regions of the at least one storage device;
determining, for the given storage region, whether at least one designated unmap condition has been met; and
providing the subset of the plurality of unmap requests to at least one storage controller associated with the at least one storage device of the distributed storage system responsive to determining that the at least one designated unmap condition has been met;
wherein the method is performed by at least one processing device comprising a processor coupled to a memory.

19. The method of claim 18 wherein data is written to the given storage region sequentially, wherein each of the plurality of unmap requests comprises metadata specifying a timestamp at which a portion of data was previously written to a corresponding one of the one or more storage regions of the at least one storage device, and wherein identifying the subset of the plurality of unmap requests which are directed to the given storage region is based at least in part on the timestamps of the plurality of unmap requests.

20. The method of claim 18 wherein the at least one designated unmap condition comprises determining that the subset of the plurality of unmap requests frees up at least a designated threshold amount of a total capacity of the given storage region.

\* \* \* \* \*